(12) United States Patent
Hsieh et al.

(10) Patent No.: US 8,605,060 B2
(45) Date of Patent: Dec. 10, 2013

(54) ELECTRONIC DEVICE WITH INFRARED TOUCH SENSING AND INFRARED REMOTE CONTROL FUNCTION

(75) Inventors: Kuan-Hong Hsieh, New Taipei (TW); Gwo-Yan Huang, New Taipei (TW); Kun-Chih Hsieh, New Taipei (TW); Wen-Hsing Lin, New Taipei (TW); Ming Li, Shenzhen (CN); Ruey-Shyang You, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 13/195,009

(22) Filed: Aug. 1, 2011

(65) Prior Publication Data

US 2012/0327030 A1    Dec. 27, 2012

(30) Foreign Application Priority Data

Jun. 22, 2011    (CN) .......................... 2011 1 0169294

(51) Int. Cl.
*G06F 3/042* (2006.01)
*G06F 3/041* (2006.01)
*G06K 11/06* (2006.01)

(52) U.S. Cl.
USPC .................. 345/175; 345/173; 178/18.01

(58) Field of Classification Search
None
See application file for complete search history.

(56) References Cited

U.S. PATENT DOCUMENTS

| | | | |
|---|---|---|---|
| 6,529,189 B1 * | 3/2003 | Colgan et al. ................. | 345/179 |
| 7,266,301 B2 * | 9/2007 | Stanchfield et al. .......... | 398/126 |
| 8,274,495 B2 * | 9/2012 | Lee ................ | 345/175 |
| 8,319,745 B2 * | 11/2012 | Lapstun et al. ............... | 345/173 |
| 2011/0096029 A1 * | 4/2011 | Zhao et al. .................... | 345/175 |

* cited by examiner

*Primary Examiner* — Alexander S Beck
*Assistant Examiner* — Ibrahim Khan
(74) *Attorney, Agent, or Firm* — Altis Law Group, Inc.

(57) ABSTRACT

An electronic device paired with an infrared remote control, includes a display screen having a display area, at least one infrared emitter, at least one infrared receiver, a prism and a processing unit. A prism is adjacent to the at least one infrared receiver for converging the infrared rays from the at least one infrared emitter and the infrared remote control to the at least one IR receiver. A processing unit is for activating and then deactivating the infrared emitters one after another, identifying operations of a user on the display area by analyzing the interception of the infrared rays emitted from each of the infrared emitters, identifying operations of a user according to the infrared signals from the infrared remote control and executing corresponding functions associated with the operations of the user.

10 Claims, 5 Drawing Sheets

ELECTRONIC DEVICE WITH INFRARED TOUCH SENSING AND INFRARED REMOTE CONTROL FUNCTION

BACKGROUND

1. Technical Field

The present disclosure relates to electronic devices and, particularly, to an electronic device with a IR touch sensing and a infrared remote control function.

2. Description of the Related Art

Many electronic devices with IR touch function include a plurality of IR emitters and IR receivers, these IR emitters and IR receivers increase the cost of the electronic device. Moreover, when user views the electronic device from a distance, the controls cannot be operated by using the IR receivers.

BRIEF DESCRIPTION OF THE DRAWINGS

The components of the drawings are not necessarily drawn to scale, the emphasis instead being placed upon clearly illustrating the principles of an electronic device with IR touch and infrared remote control function. Moreover, in the drawings, like reference numerals designate corresponding parts throughout multiple views.

DETAILED DESCRIPTION

Figure 1:
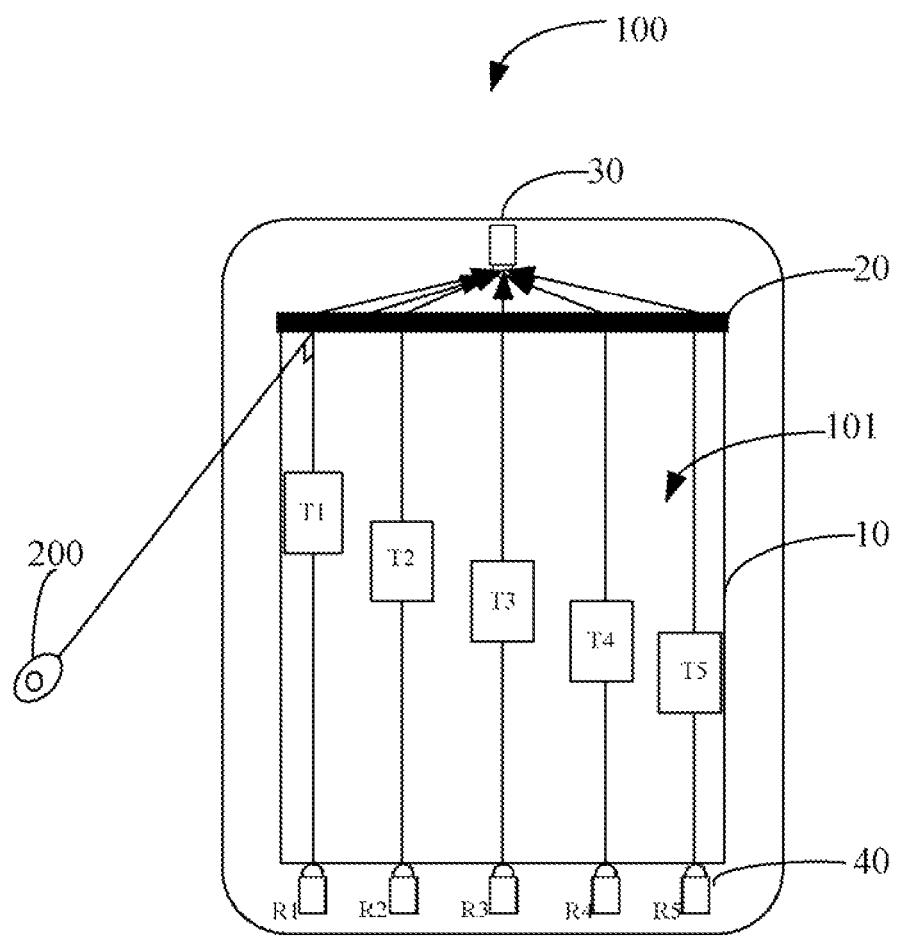
FIG. 1 is a schematic view of an electronic device with IR touch and infrared remote control function in accordance with a first exemplary embodiment.

Referring to FIG. 1, an electronic device 100 is capable of identifying input operations on a touch screen of the electronic device 100 and on an infrared remote control 200 paired with the electronic device. The electronic device 100 includes a touch display screen 10 having a display area 101, a prism 20, at least one IR receiver 30 and at least one IR emitter 40 are arranged on opposite sides of the touch display screen 10. One of the at least one IR receiver 30 receives infrared rays emitted by at least one IR emitter 40 and the infrared remote control 200 and detecting interception of the infrared rays from each of the infrared emitters 40. The prism 20 is placed facing the receiving end of the IR receiver 30 for converging the infrared rays from the IR emitter 40 and the infrared remote control 200.

In the embodiment, the number of the at least one IR receiver 30 is one, and the number of the at least one IR emitters 40 is five. The IR receiver 30 is fixed on the top of the touch display screen 10, and the IR emitters 40 are equally spaced on the bottom of the touch display screen 10. The IR emitters 40 emit infrared rays across the display area 101 of the touch display screen 10 and the infrared rays from one of the IR emitters 40 are generally nonparallel to the infrared rays from another one of the IR emitters 40. The infrared rays emitted by one of the IR emitters 40 corresponds to an icon displayed on the touch display screen 10 and passes over the icon. For example, the infrared rays from the IR emitter R1 passes over an icon T1, the infrared rays from the IR emitter R2 passes over an icon T2 . . . . When users touch or click an icon, the infrared rays passing the icon is blocked, the IR receivers senses the block event of the infrared rays and reports the block event to a processing unit (see FIG. 5) of the electronic device 100. The processing unit accordingly activates a function of the electronic device 100 corresponding to the icon, for example, if a read mode icon is touched, the infrared rays passing the read mode icon is blocked, the processing unit activates a reading mode according to the block event.

Figure 2:
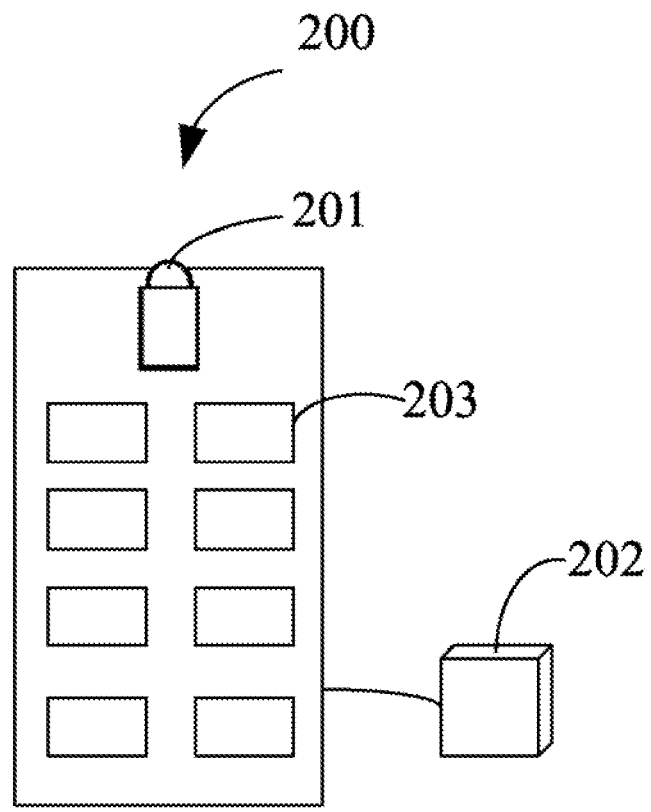
FIG. 2 is a schematic view of an infrared remote control for controlling the electronic device of FIG. 1.

Referring to FIG. 2, in the embodiment, the infrared remote control 200 includes an IR emitter 201, a processor 202, and a button 203. The button 203 receives control operations of users and generates control signals. The processor 202 controls the IR emitter 201 to emit infrared rays to the prism 20 of the electronic device 100. The infrared rays carry the control signals. The prism 20 reflects and further refracts the infrared rays to the IR receiver 30. In an alternative embodiment, there are a number of the IR receivers 30, and each of the IR receivers 30 receives infrared rays from a number of IR emitters 40.

Figure 3:
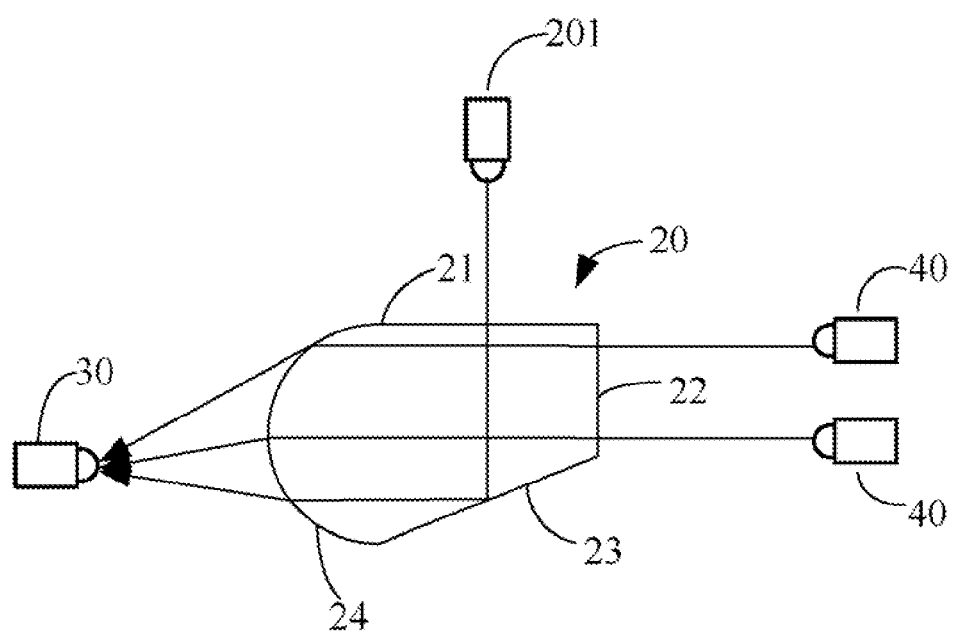
FIG. 3 is a schematic view showing a prism of the electronic device of FIG. 1, the prism converging infrared rays emitted by the electronic device and the infrared remote control.

Referring to FIG. 3, in the embodiment, the cross-section of the prism 20 is substantially ladder-shaped and includes a first light incident surface 21, a second light incident surface 22, a light reflection surface 23 and a light emitting surface 24. The first light incident surface 21 and the second light incident surface 22 receive infrared rays from the IR emitter 201 of the infrared remote control 200 and the IR emitter 40 of the electronic device 100 respectively. The first light incident surface 21 is substantially perpendicular to the second light incident surface 22, and the IR emitters 40 are placed facing the second light incident surface 22. The infrared rays emitted by the IR emitter 40 pass through the second light incident surface 22 to enter the prism 20 and exit out the prism 20 from the light emitting surface 24. The infrared rays emitted by the IR emitter 201 pass through the first light incident surface 21 to enter the prism 20, reflected by the light reflection surface 23 and exit out the prism 20 from the light emitting surface 24. The infrared rays converge on the light emitting surface 24 so that the IR receiver 30 can receive the infrared rays from both the IR emitter 201 and 22.

The light reflection surface 23 is obliquely oriented with respect to both the first light incident surface 21 and the second light incident surface 22. The light reflection surface 23 is coated or covered with a layer of reflection material for reflecting the infrared rays to the light emitting surface 24. In the embodiment, the inclined angle of the light emitting surface 23 relating to the second light incident surface 22 is approximately 45 degrees.

Figure 4:
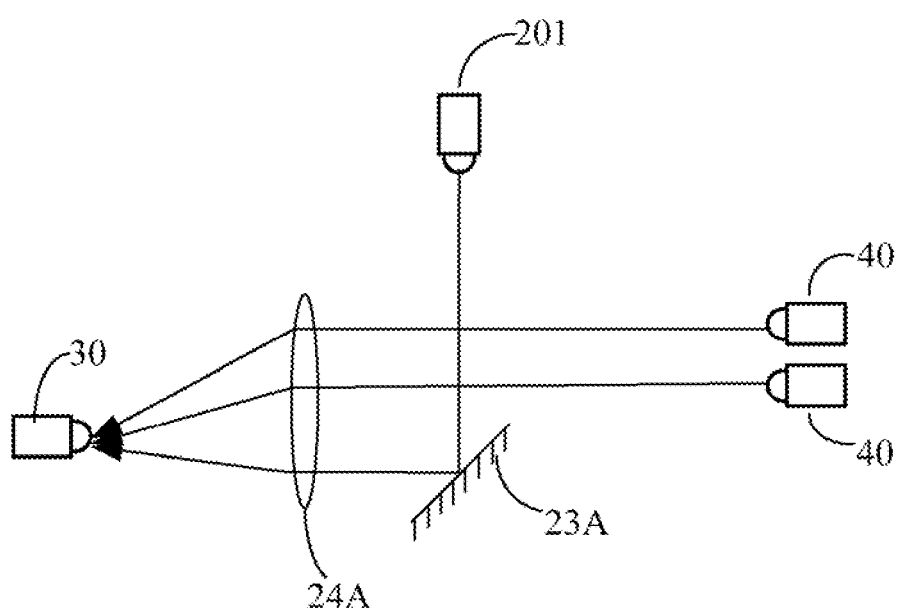
FIG. 4 is a schematic view showing a reflector and collector lens converging infrared rays emitted by an electronic device and an infrared remote control in accordance with a second exemplary embodiment.

Referring to FIG. 4, in an alternative embodiment, the prism 20 can be displaced a reflector 23A and a converging lens 24A, the reflector 23A reflects the infrared rays emitted by the emitters 201 to the converging lens 24A. The infrared rays from the infrared emitters 40 and the reflected infrared rays from the reflector 23A are further converged on the converging lens 24A of the receiver 30.

Figure 5:
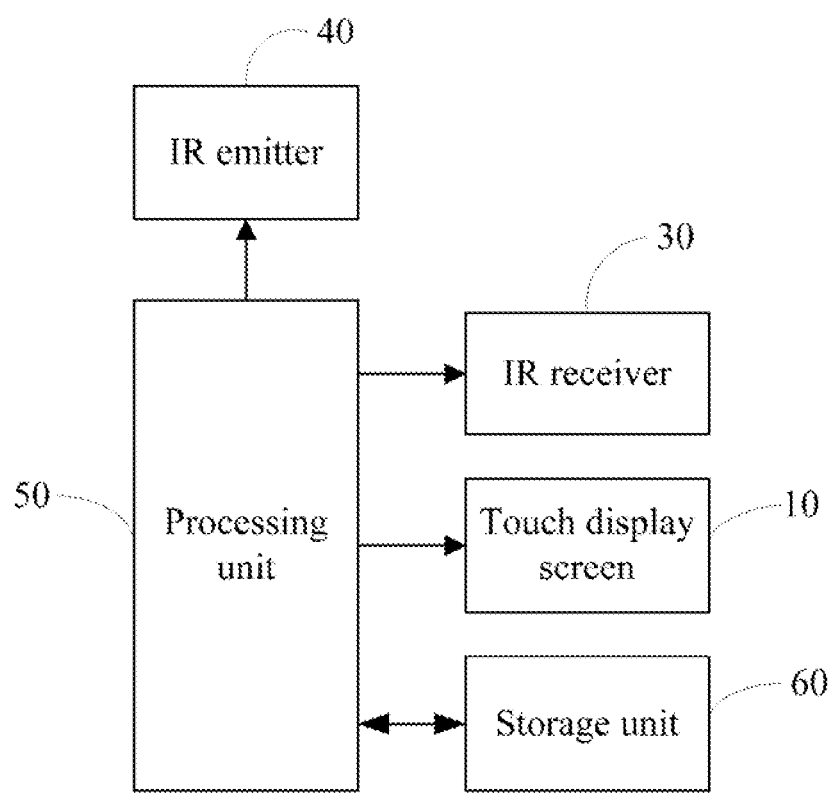
FIG. 5 is a block diagram of the electronic device of FIG. 1.

Referring to FIG. 5, the electronic device 100 further includes a processing unit 50 and storage unit 60. The storage unit 60 stores digital files. The processing unit 50 is electrically connected to the IR receiver 30, the IR emitters 40 and the touch display screen 10. The processing unit 50 activates and then deactivates the IR emitters 40 one after the other. Thus, identifying the operation of users to an icon by analyzing the interception of the infrared rays emitted from each of the infrared emitters 40 corresponding to the icon, and then executing corresponding function associated with the icon to display a file on the touch display screen 10. The processing unit 50 also identifies operations of a user according to the infrared signals from the infrared remote control 200 and executes corresponding functions associated with the operations of the user.

In the embodiment, the processing unit 50 identifies the infrared rays emitted by the IR emitters 40 or the IR emitter 201 according to the type and frequency of the infrared rays. For example, the infrared rays emitted by the IR emitter 201 of the infrared remote control 200 are digital coding signals modulated over a 38 KHz carrier wave, and the infrared rays emitted by the IR emitters of the electronic device are 200 HZ discrete-time analog signals. If the processing unit 50 identifies the infrared rays are digital coding signals modulated 38 KHZ carrier wave, the processing unit 50 determines the infrared rays are from the IR emitters 201. If the processing unit 50 identifies the infrared rays are 200 HZ discrete-time analogy signals, the processing unit 50 determines the infrared rays are from the IR emitters 40.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
a display screen having a display area configured for displaying information;
a plurality of infrared emitters configured for emitting infrared rays across the display area of the display screen;
at least one infrared receiver configured for receiving the infrared signals from an infrared remote control paired with the electronic device and detecting interception of the infrared rays from each of the infrared emitters by a user;
a prism adjacent to the at least one infrared receiver, the prism configured for converging and directing the infrared rays from the infrared emitters and infrared rays from the infrared remote control to the at least one infrared receiver; wherein the prism comprises a first light incident surface to receive the infrared rays from the infrared remote control, a second light incident surface facing the infrared emitters to receive the infrared rays from the infrared emitters, a light reflection surface and a light emitting surface; the light reflection surface is configured to reflect the infrared rays from the first light incident surface to the light emitting surface, and the light emitting surface is configured to converge the infrared rays from the infrared emitters and infrared rays from the infrared remote control to the at least one infrared receiver; and
a processing unit configured for activating and then deactivating the infrared emitters one after another, identifying operations of a user on the display area by analyzing the interception of the infrared rays emitted from each of the infrared emitters, identifying operations of a user according to the infrared signals from the infrared remote control and executing corresponding functions associated with the operations of the user.

2. The electronic device as claimed in claim 1, wherein the at least one infrared receiver and the infrared emitters are arranged on opposite sides of the display screen.

3. The electronic device as claimed in claim 1, wherein the infrared emitters are arranged along an edge of the display area of the display screen.

4. The electronic device as described in claim 1, wherein the infrared rays emitted from the infrared emitters are non-parallel to each other.

5. The electronic device as described in claim 1, wherein the the first light incident surface is substantially perpendicular to the second light incident surface.

6. The electronic device as described in claim 5, wherein the light reflection surface is obliquely oriented with respect to both the first light incident surface and the second light incident surface.

7. The electronic device as described in claim 5, wherein the light reflection surface is inclined 45 degrees relative to the second light incident surface.

8. The electronic device as described in claim 1, wherein the processing unit is configured for identifying the infrared rays emitted from the infrared emitters and the infrared remote control according to frequency bands associated therewith.

9. The electronic device as described in claim 1, wherein the infrared rays emitted from the infrared remote control are digital coding signals modulated over a 38 KHZ carrier wave, and the infrared rays emitted from the infrared emitters are 200 Hz discrete-time analog signals.

10. The electronic device as described in claim 1, wherein the prism comprises a reflector and a converging lens; the reflector is configured for reflecting the infrared rays emitted from the infrared remote control to the converging lens; the converging lens is configured for converging the infrared rays from the infrared emitters and the reflected infrared rays from the reflector.

* * * * *